Figure 1:
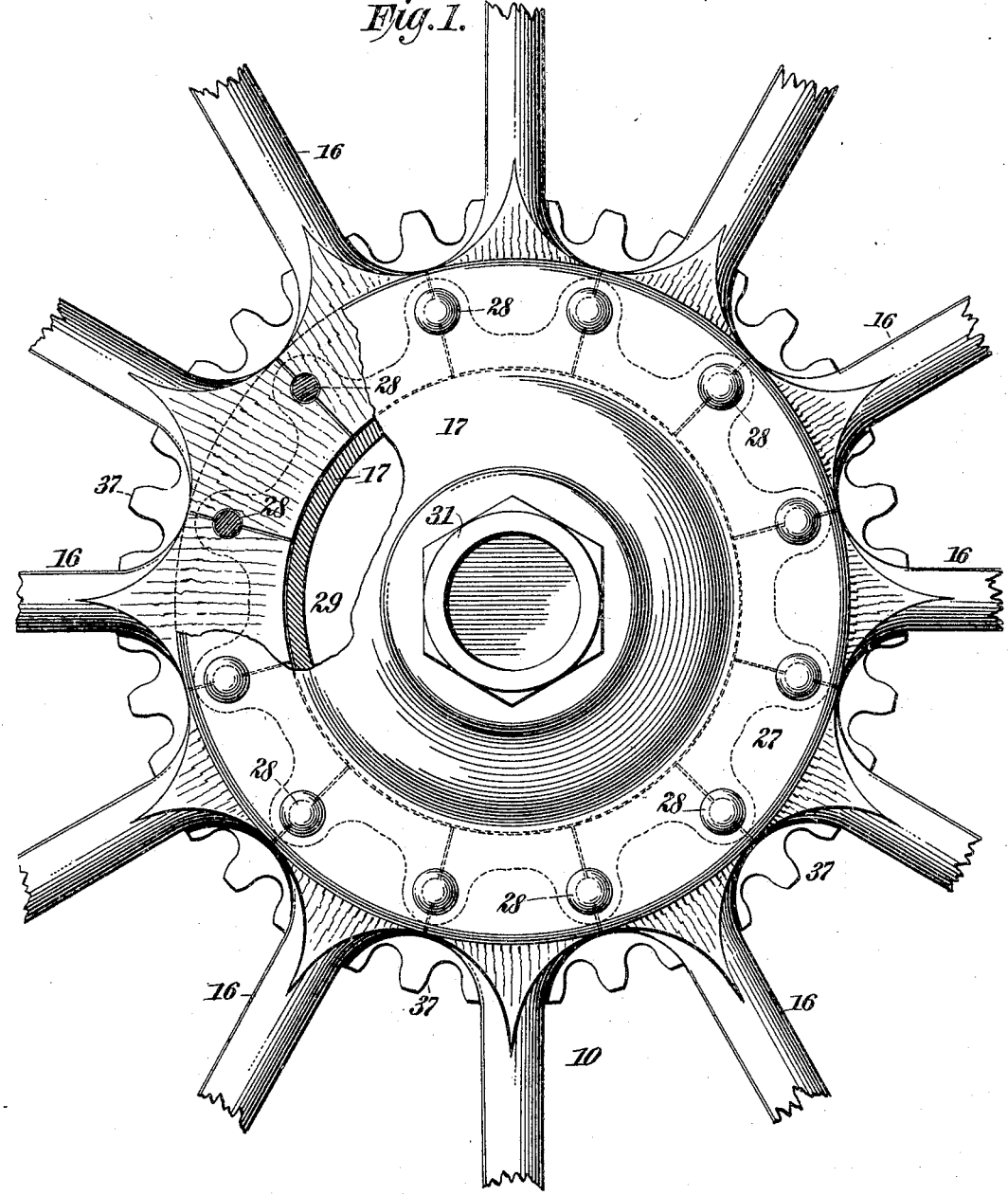

No. 792,649. PATENTED JUNE 20, 1905.
E. CLIFF.
AUTOMOBILE OR OTHER VEHICLE.
APPLICATION FILED DEC. 21, 1904.

4 SHEETS—SHEET 1.

WITNESSES:
Gustave Dieterich
Edwin N. Dieterich

INVENTOR
Edward Cliff
BY
Chas. E. Gill
ATTORNEY

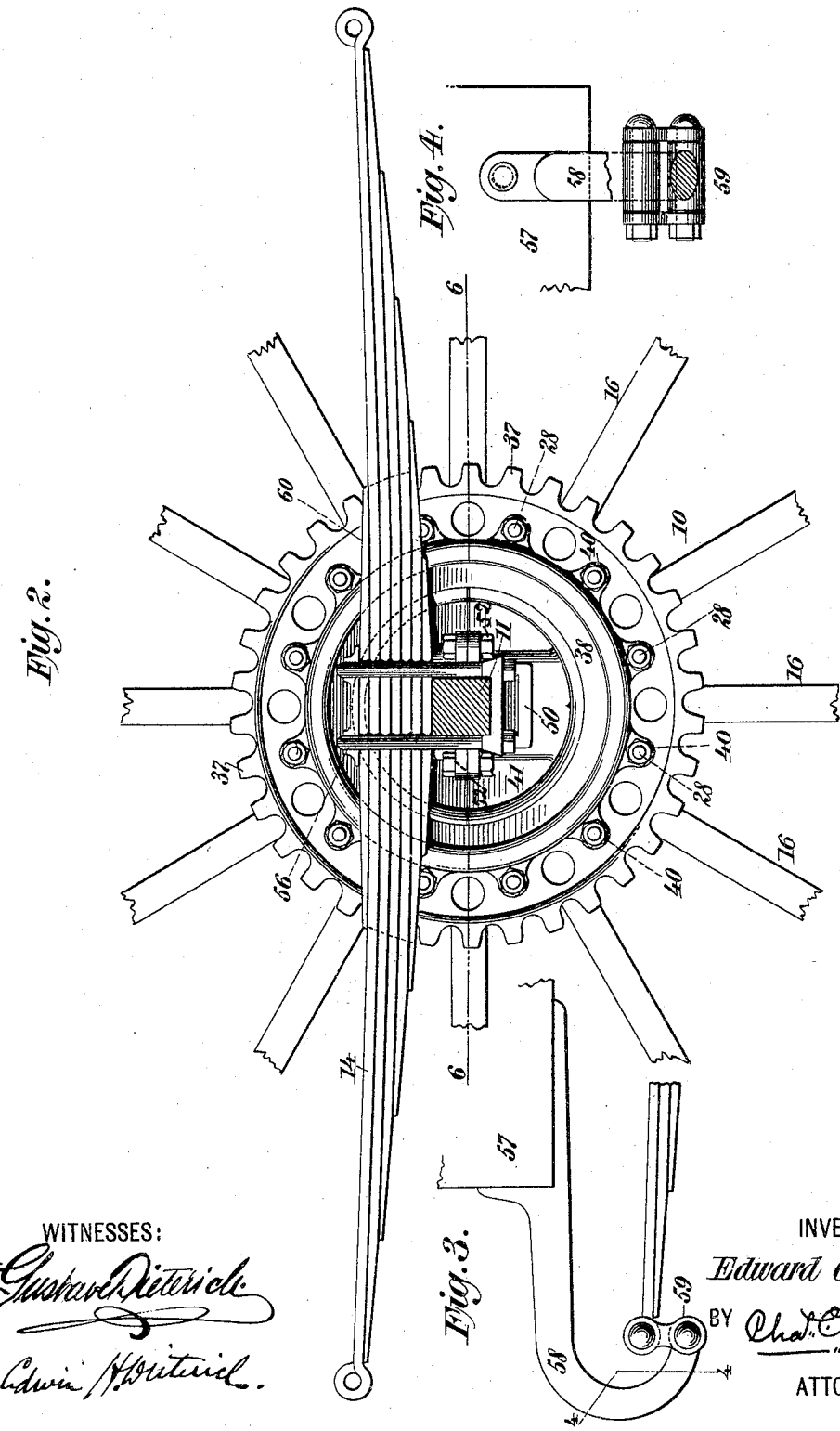

No. 792,649. PATENTED JUNE 20, 1905.
E. CLIFF.
AUTOMOBILE OR OTHER VEHICLE.
APPLICATION FILED DEC. 21, 1904.

4 SHEETS—SHEET 3.

WITNESSES:
Gustave Dieterich.
Edwin H. Dieterich.

INVENTOR
Edward Cliff
BY Chas. E. Gill
ATTORNEY

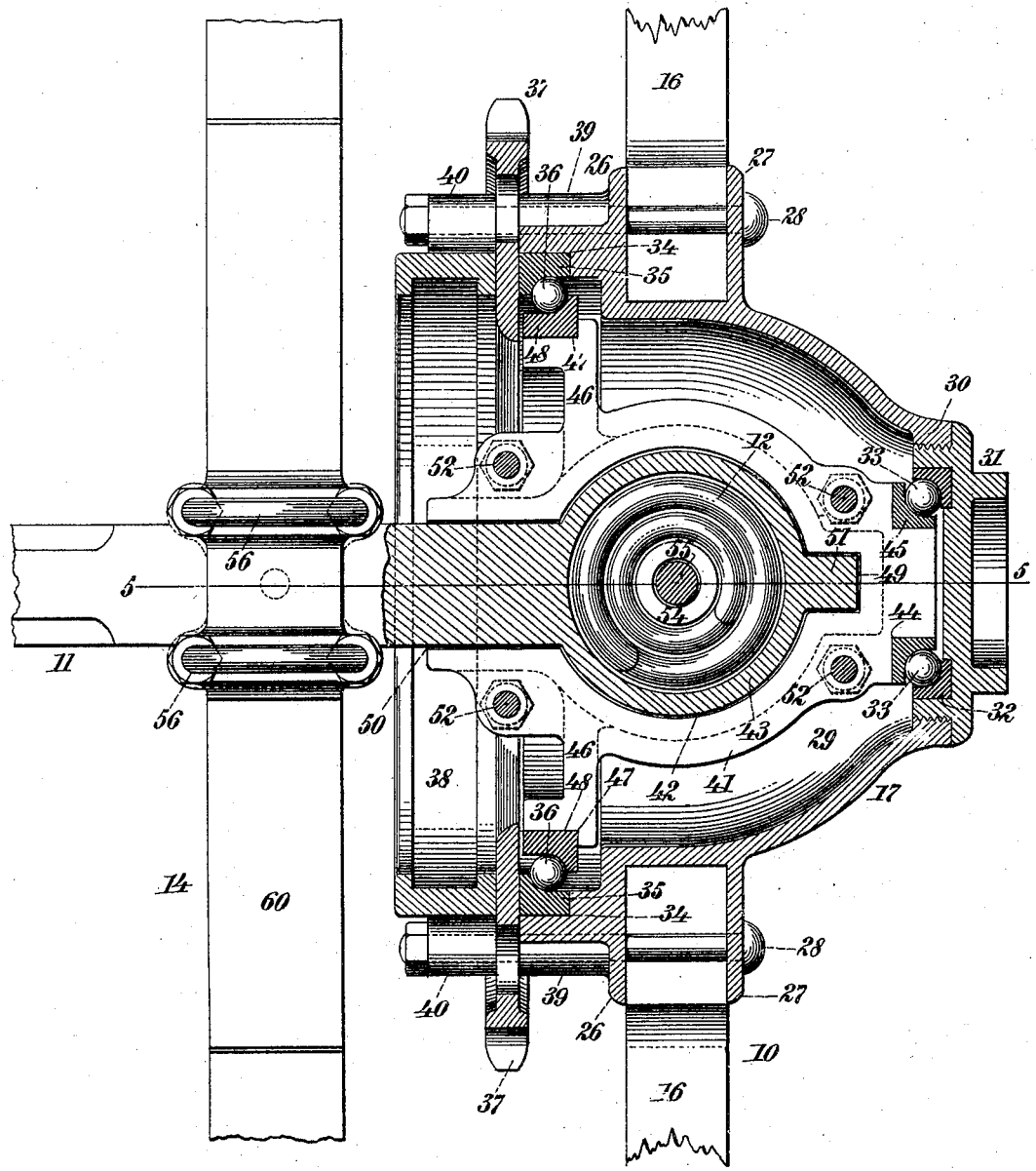

No. 792,649. Patented June 20, 1905.

UNITED STATES PATENT OFFICE.

EDWARD CLIFF, OF NEW YORK, N. Y.

AUTOMOBILE OR OTHER VEHICLE.

SPECIFICATION forming part of Letters Patent No. 792,649, dated June 20, 1905.

Application filed December 21, 1904. Serial No. 237,751.

*To all whom it may concern:*

Be it known that I, EDWARD CLIFF, a citizen of the United States, and a resident of New York city, in the county of New York and State of New York, have invented certain new and useful Improvements in Automobiles or other Vehicles, of which the following is a specification.

The invention relates to improvements in automobiles and other vehicles; and it consists in the novel features, arrangements, and combinations of parts hereinafter described, and particularly pointed out in the claims.

Among the objects of my invention are to provide an easy-riding vehicle, to dispense with the usual inflated tires on the wheels of automobiles, to provide for the supporting of the body of the vehicle from the axles on a combination of coiled and elliptic or semi-elliptic springs whereby to obtain a novel joint action of said springs in supporting and relieving the said body from shock or jar, and to provide a novel construction of the wheels and axles whereby the ends of the axle may be spring-supported within the hubs of the wheels, with the body of the vehicle mounted upon the axles intermediate the springs confined within the wheel-hubs, the spring-casings within the hubs of the wheel being stationary, so far as rotation is concerned, and affording a fixed bearing around which the wheels may always rotate upon fixed axial centers.

In the preferred embodiment of my invention I provide the supporting-wheels with hollow hubs of novel construction, chambered casings within said hubs and affording roller-bearings for the wheels, axles having on their ends chambered casings to move within the said casings in said hubs and mounted upon coiled springs held therein, and leaf-springs of elliptic order upon said axles intermediate the wheels and supporting the body of the vehicle, whereby the latter becomes supported in the preferred construction upon, at each end of the axle, a spring arrangement consisting of coiled springs and elliptic springs coacting with each other. I also provide the wheels with a solid cushion-tire and secure the same by novel means, these tires aiding in preventing noise and adding to the comfort of the persons riding within the vehicle.

The invention will be fully understood from the detailed description hereinafter presented, reference being had to the accompanying drawings, in which—

Figure 5:
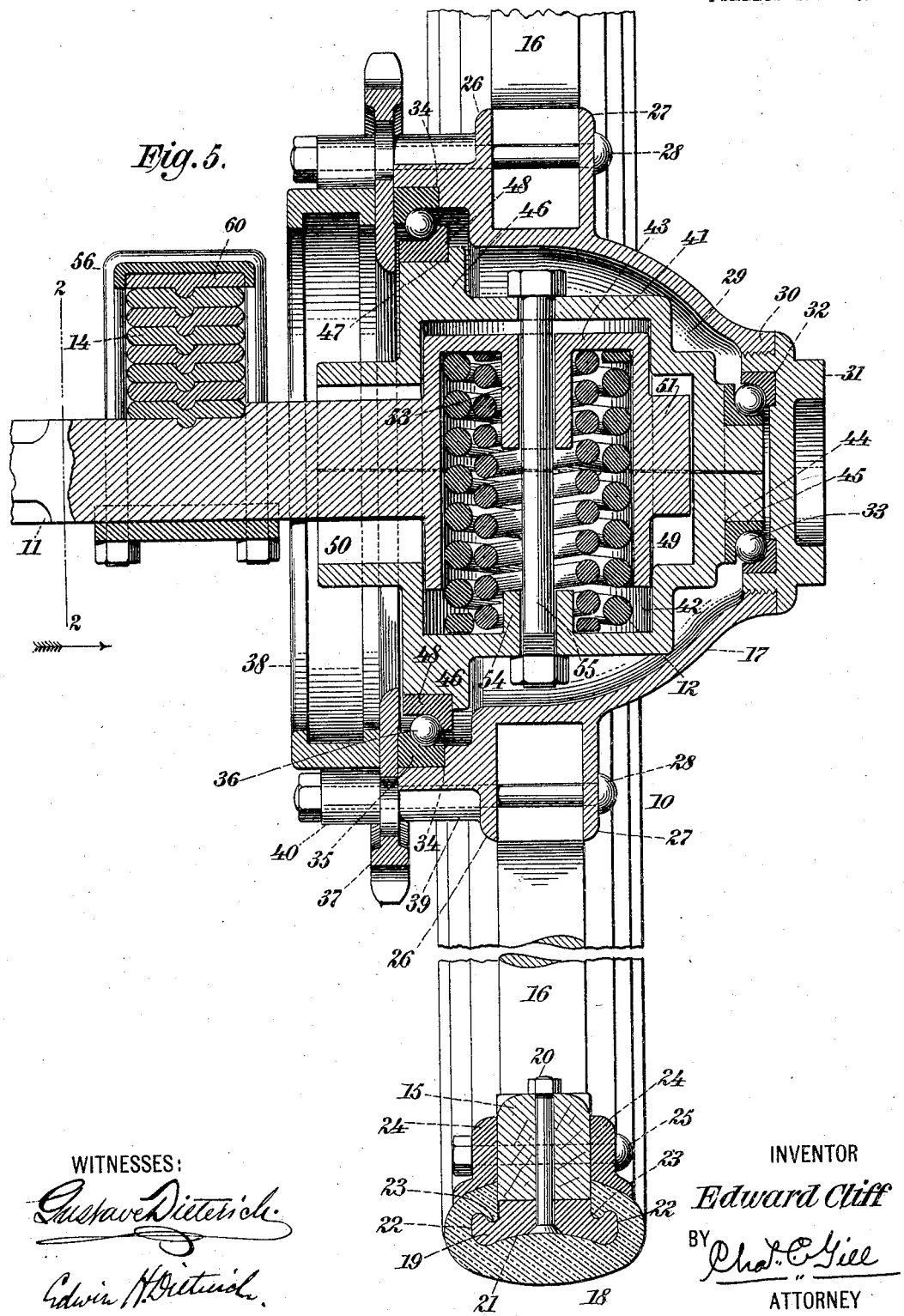

Figure 1 is a side elevation, partly broken away and partly in section, of a wheel constructed in accordance with and embodying the invention. Fig. 2 is a vertical section through one axle on the dotted line 2 2 of Fig. 5 and illustrates in side elevation a portion of one of the wheels. Fig. 3 is a detached side elevation showing a portion of the vehicle-body and the method of supporting the same upon the end of the elliptic spring. Fig. 4 is an end view, partly broken away and partly in section on the dotted line 4 4 of Fig. 3, of the means for supporting the vehicle-body upon the end of the elliptic spring. Fig. 5 is a central vertical transverse section on the dotted line 5 5 of Fig. 6 through the wheel and a portion of the axle and the elliptic spring, the wheel outside of the hub portion being partly broken away; and Fig. 6 is a horizontal section of same on the dotted line 6 6 of Fig. 2.

In the drawings I illustrate but one wheel of the automobile and one end of one axle, because all of the wheels of the vehicle will be exactly alike, and therefore the invention may be fully understood from the illustration and description of one wheel, with its axle and springs, it being understood that each axle will be provided at each end with a wheel and springs of the construction shown.

Referring to the drawings, 10 designates the wheel; 11, the rear axle; 12, the coiled spring, and 14 the leaf-spring, the latter being of elliptic order. The front axle for automobiles will preferably be in two sections, as usual.

The wheel 10, comprises the felly 15, spokes 16, hollow hub 17, and preferably a cushion-tire 18, the latter being secured upon the metal inner tire 19, which is retained in place by means of bolts 20 extending through the same the through the felly 15. The inner metal tire or band 19 is concave at its outer surface, as at 21, Fig. 5, and at its side edges is formed with the laterally-extending portions 22 22, in which are formed the grooves 23 23. The cushion-tire 18, preferably of rubber, conforms to the outer and edge surfaces of the inner metal tire or band 19, and its inner edge portions are compressed into the grooves 23 and clamped against the sides of the felly 15 and band 19 by means of the side clamping-plates 24, which extend entirely around the rim of the wheel and are fastened in place by means of bolts 25. The clamping-plates 24 firmly bind the cushion-tire 18 down against the laterally-extending portion of the inner tire or band 19 and enable the ready application of the said tire 18 and its renewal at will.

The spokes 16 will preferably be of wood, and their inner wedge-shaped ends engage with one another at their side edges and tightly fit between the annular flanges 26 27, extending from and being integral with the hollow hub 17, and the said spokes are at their inner ends secured between the said flanges 26 27 by means of the transverse bolts 28, which extend through both of said flanges and through corresponding recesses formed in the meeting edges of the inner wedge-shaped ends of the spokes 16, as more clearly illustrated in Fig. 1. The manner of securing the spokes at their inner ends to the hub 17 is important in that thereby a very strong and durable wheel structure is produced, and the manner of securing the cushion-tire 18 to the rim of the wheel is important in that said tire may be readily applied and renewed and is very firmly held in place.

The hollow hub 17 forms within it the chamber 29 and is in the form of a casting of suitable and preferably attractive outline and is normally open at both ends, the outer end of said casting being formed with the internally-threaded flange 30, adapted to receive the threaded closing cap or plug 31, which at its inner annular portions is formed with an annular recess to receive the annular raceway 32 for the roller-bearings 33. The inner end of the hollow hub 17 is formed with the annular recess 34 to receive the raceway 35 for the roller-bearings 36, the bearings 33 36 being concentric with each other and constituting the bearings for the rotation of the wheel.

Upon the inner edges of the hollow hub 17 are secured the sprocket-wheel 37 and brake-flange 38, this sprocket-wheel 37 and this brake-band 38 not being of unusual construction, but being in the present instance secured to the wheel by means of the bolts 28, which secure the spokes to the hub, the hub being provided with the sleeves 39 and the band-wheel 38 being provided with the sleeves 40, through which the bolts 28 pass and between which the outer portions of the sprocket-wheel 37 are clamped. The central portions of the sprocket-wheel 37 and brake-flange 38 are entirely open, so that the axle 11 and its connections may extend through the same.

Within the hollow hub 17 is placed the vertical casing 41, within which is formed a cylindrical chamber 42 to receive the coiled spring or springs 12 and vertically-movable casing 43, the latter being in the form of an inverted cup or vertical cylinder open at its lower end and being integral with the axle 11, and said coiled springs being confined between the base of the casing 41 and the inner upper surface of the casing 43. The casing 41 does not rotate with the hub 17, and it is formed at its outer end with an annular recess 44 to receive the hardened raceway 45 for the roller or ball bearings 33, while at the inner annular edges of the said casing is formed a flange 46, containing an annular recess 47 to receive the hardened raceway 48 for the roller or ball bearings 36. The casing 41 thus affords the central axis for the wheel 10, and this axis is always a fixed quantity, said casing 41 always preserving its initial relation to the axial center of the wheel without regard to any movement of the springs or axle 11. The casing 41 is formed at the inner portion of its outer end with the vertical groove 49 and at its inner end with the vertical guideway or opening 50, the said groove 49 and guideway 50 being provided to permit of the proper vertical movements of the axle 11 and to enable said axle to resist any tendency of the casing 41 to rotate with the hub of the wheel. At the outer end of the axle 11 is provided a flange 51, which is closely engaged at its opposite sides by the walls of the groove 49, and the axle 11 where it passes through the opening or guideway 50 is closely engaged at its opposite side edges by the side walls of said opening or guideway, and thus the axle constitutes means for preventing any rotation of the casing 41, while permitting the hub 17 to rotate upon said casing. The casing 41 is preferably formed of two horizontal sections or parts, which after receiving the springs and casing 43 will be fastened together by means of vertical bolts 52, as shown in Fig. 6, wherein the top of the lower section or part of said casing 41 is shown. The casing 43 will be less in depth than the depth of the chamber 42 within the casing 41, so that said casing 43 may during the travel of the vehicle be permitted to have a proper yielding vertical movement within said chamber. The upper portion of the casing 43 is formed with the downwardly-extending sleeve 53, and the lower portion of the casing 41 is formed with the upwardly-extending sleeve 54, and through these sleeves 53 54 extends a central bolt 55, which aids in guiding the casing 43 in its vertical movements, in securing the upper and lower sections or parts of the casing 41 together, and in preventing the rotation of the casing 41 with the hub 17. The sleeves 53 54 furnish broad surfaces for the sides of the bolt 55, and they also aid in centering and maintaining the springs 12, which preferably for each wheel will be two in number, as shown in Fig. 5, the outer spring being somewhat heavier than the inner spring.

When the parts hereinbefore described are in position and the vehicle is in use, the load upon the axle 11 will tend to depress the latter, and this will cause a compression of the springs 12 between the upper end of the casing 43 and lower end of the casing 41, and thus the vehicle-body will be spring-supported independently of any cushioning effect which may be derived from the tire 18, and during the travel of the vehicle the springs 12 will absorb the shocks and jars which otherwise might be imparted to the body of the vehicle. The casing 43 will during the travel of the vehicle be guided in its vertical reciprocations by the cylindrical walls of the chamber 42, the surfaces of the bolt 55, the opposite walls of the groove 49, and the opposite walls of the opening or guideway 50, and it is my purpose to provide an ample body of lubricant within the said chamber 42, so that the casing 43 may at all times be properly lubricated. The springs 12 should have such strength that under the normal weight of the body of the vehicle they will become partly compressed, which is their condition represented in Fig. 5. Under such load as the body of the vehicle may be compelled to carry the springs 12 will become further compressed.

The hub construction above described, while being of that strong and durable character required for automobiles and while affording the coiled spring-supports for the ends of the axle and providing a fixed axial center of rotation for the wheel, is also advantageous in that it resists any tendency of the wheel to incline in either direction. The raceways for the ball or roller bearings are oppositely disposed—that is, for illustration the groove in the raceway 45 opens toward the outer side of the wheel and the groove for the raceway 48 opens toward the inner side of the wheel—and this feature, with the coöperating construction of the other raceways 32 35, aids in preventing the tilting of the wheel. The wheel is also prevented from tilting by reason of the engagement of the casings 41 43, the latter being centrally of the axle 11 and engaging the inner walls of the casing 41 both above and below said axle, and, incidentally, all of the coöperating features of the hollow hub and axle connections are so arranged and disposed as to maintain the wheel vertical and at right angles to the axle 11.

Each of the wheels of the vehicle and each end of each axle will possess the construction above described, and without regard to any further springs or features the wheels and axles thus constructed constitute an important part of my invention and may be used with or without the leaf-springs 14, which I will presently describe. I have discovered, however, that special advantages may be secured from the employment in direct connection with the axles of both the coiled springs 12 and elliptic springs 14, these springs coöperating to produce a very much more comfortable riding action in the body of the vehicle when both are employed at each end of each axle than could be attained by the use of either of said springs alone or of either of said springs with an inflated tire. I therefore provide as a part of the preferred embodiment of my invention the leaf-spring 14 at each end of each of the axles 11, and this spring 14, comprising a suitable number of leaves, is clamped upon the axle 11 by suitable clips 56 and receives at its ends the vehicle-body 57, Fig. 3, by means of suitable bracket-hangers 58 and links 59, the body 57, brackets 58, and links 59 being of usual construction. The spring 14 is provided on its upper surface with a special elastic or spring plate 60, which is very much less in length than the upper leaf of the spring and is intended for the one sole purpose of resisting the upward-rebounding movement of the spring. Elliptic springs and semi-elliptic springs are well-known features of automobile construction, and the breakage of these springs has been a source of very considerable expense and annoyance, and one purpose of my invention is to provide the springs with a reacting-plate 60 for preventing the breakage of the springs, which breakage is due not so much to the load, but to the rebound of the spring, the breakage occurring during the rebounding movement of the spring. The plate 60 is not a clip-plate, but extends outwardly beyond the clip-plate, and it is yielding to some extent, but its tendency is to act downwardly against the spring and to resist the rebounding action of the spring, the plate 60 being an opposite plate and opposing the rebounding action of the spring. Before the leaves of the spring and plate 60 are clamped together the leaves (in the case of the semi-elliptic spring shown) bow downwardly and the plate 60 bows upwardly, and hence when the leaves of the spring and the plate 60 are clamped together the plate 60 will act in opposition to the leaves, controlling and improving their action and preventing that excessive and sudden rebounding action of the spring which has so frequently caused the breakage of elliptic and semi-elliptic springs. The plate 60 is not only of value in preventing the breakage of the springs, but in retaining the springs in their active cushioning condition, whereby the body of the vehicle becomes and remains supported under a sensitive condition of the springs. The spring 14 aside from the plate 60 and its combination with the coiled springs, also connected with the axle 11, is not of unusual construction.

I present in the drawings the preferred embodiment of my entire invention, for the reason that in addition to the advantages derivable from the combined spring action other advantages may be attained, due to the location of the coiled springs within the hub of the wheel. The coiled springs 12 are sensitive and receive and mince up the shocks and jars due to the wheels passing over uneven surfaces, and the elliptic springs are less sensitive, or slow and lazy, due to the friction of the leaves or plates, and they absorb such of the shocks and jars as may reach them, and hence these two springs relieve the body of the vehicle and produce an easy riding action. The coiled springs and elliptic springs are in near relation to each other and immediately connected with the axle, the elliptic springs and coiled springs both being by preference centrally in line with the vertical plane of the axle, so that the axle may be supported directly upon the coiled springs and directly support the elliptic springs, this arrangement of the springs affording the maximum efficiency in their joint action. My invention is not limited to the use of semi-elliptic springs, since both semi-elliptic and whole elliptic springs are in familiar use for supporting the bodies of automobiles, and in instances in which it may be desired to utilize my invention in vehicles requiring whole elliptic springs I shall apply to each half of the spring the reacting plate 60 to improve the action of the springs and prevent their breakage during their rebounding action. The springs 14 may extend transversely of the vehicle-body, but will preferably extend longitudinally of the vehicle, with their centers on the axles.

In presenting the preferred embodiment of my invention I have described a specific tire construction and a specific elliptic-spring construction, and I propose to make these two constructions the subjects-matter of separate applications for Letters Patent.

What I claim as my invention, and desire to secure by Letters Patent, is—

1. A vehicle comprising a body, axles and wheels, combined with semi-elliptic springs extending transversely of and mounted on said axles and supporting said body, and coiled springs upon which said axles are supported, said elliptic springs each having a top reacting spring-plate; substantially as set forth.

2. A vehicle comprising a body, axles and wheels, combined with leaf-springs of elliptic character mounted on said axles and supporting said body, and coiled springs upon which said axles are supported, said elliptic springs each having as a part thereof a reacting spring-plate to resist the rebounding action of the spring; substantially as set forth.

3. In a vehicle, the axle supporting the body and having wheels on its ends, said wheels having hollow hubs, combined with spring-cushioning means within said hubs for the ends of said axle, said means for each wheel comprising a casing around which the wheel may turn and containing a vertical chamber, a part on the end of the axle and occupying the upper part of said chamber, a coiled spring confined between said part and the base of said chamber and receiving the load placed on the axle, and means for keeping said casing vertical; substantially as set forth.

4. In a vehicle, the axle supporting the body and having wheels on its ends, said wheels having hollow hubs, combined with spring-cushioning means within said hubs for the ends of said axle, said means for each wheel comprising a casing around which the wheel may turn and containing a vertical chamber, an inverted-cup-shaped casing on the end of the axle and disposed within said chamber, a coiled spring confined within said chamber between said casings and receiving the load placed on the axle, and means for keeping said first-mentioned casing vertical; substantially as set forth.

5. In a vehicle, the axle supporting the body and having wheels on its ends, said wheels having hollow hubs, combined with spring-cushioning means within said hubs for the ends of said axle, said means for each wheel comprising a casing around which the wheel may turn and containing a vertical chamber, an inverted-cup-shaped casing on the end of the axle and disposed within said chamber, a coiled spring confined within said chamber between said casings and receiving the load placed on the axle, and a bolt extending vertically through said casings and spring; substantially as set forth.

6. In a vehicle, the axle supporting the body and having wheels on its ends, said wheels having hollow hubs, combined with spring-cushioning means within said hubs for the ends of said axle, said means for each wheel comprising a casing around which the wheel may turn and containing a vertical chamber, an inverted-cup-shaped casing on the end of the axle and disposed within said chamber, a coiled spring confined within said chamber between said casings and receiving the load placed on the axle, and a bolt extending vertically through said casings and spring, said cup-shaped casing having a depending sleeve and the other casing an upwardly-extending sleeve to receive said bolt; substantially as set forth.

7. In a vehicle, the axle supporting the body and having wheels on its ends, said wheels having hollow hubs, combined with spring-cushioning means within said hubs for the ends of said axle, said means for each wheel comprising a casing around which the wheel may turn and containing a vertical chamber extending above and below the horizontal plane of the axle, a part on the end of the axle and occupying the upper part of said chamber, a coiled spring confined between said part and the base of said chamber and receiving the load placed on the axle, and means for keeping said casing vertical; substantially as set forth.

8. In a vehicle, the axle supporting the body and having wheels on its ends, said wheels having hollow hubs, combined with spring-cushioning means within said hubs for the ends of said axle, said means for each wheel comprising a casing around which the wheel may turn and containing a vertical chamber extending above and below the horizontal plane of the axle, an inverted-cup-shaped casing on the end of the axle and extending above and below the same and disposed within said chamber, a coiled spring confined within said chamber between said casings and receiving the load placed on the axle, and means for keeping said first-mentioned casing vertical; substantially as set forth.

9. In a vehicle, the axle supporting the body and having wheels on its ends, said wheels having hollow hubs, combined with spring-cushioning means within said hubs for the ends of said axle, said means for each wheel comprising a casing around which the wheel may turn and containing a vertical chamber extending above and below the horizontal plane of the axle, an inverted-cup-shaped casing on the end of the axle and extending above and below the same and disposed within said chamber, a coiled spring confined within said chamber between said casings and receiving the load placed on the axle, and means for keeping said first-mentioned casing vertical, said casing being formed of upper and lower sections bolted together and affording a cylindrical chamber, and said cup-shaped casing being conformed to said chamber; substantially as set forth.

10. In a vehicle, the axle supporting the body and having wheels on its ends, said wheels having hollow hubs provided with raceways for the bearings, and said hubs containing hollow casings having complemental raceways for said bearings and vertical openings at their inner sides for the axle, combined with spring-cushioning means within said hubs for said axle, said means for each wheel comprising the said hollow casing forming within it a vertical chamber, a part on the end of the axle and occupying the upper part of said chamber, and a coiled spring confined between said part and the base of said chamber and receiving the load placed on the axle; substantially as set forth.

11. In a vehicle, the axle supporting the body and having wheels on its ends, said wheels having hollow hubs provided with raceways for the bearings, and said hubs containing hollow casings having complemental raceways for said bearings and vertical openings at their inner sides for the axle, combined with spring-cushioning means within said hubs for said axle, said means for each wheel comprising the said hollow casing forming within it a vertical chamber, an inverted-cup-shaped casing on the end of the axle and disposed within said chamber, and a coiled spring confined within said chamber between said casings and receiving the load placed on the axle; substantially as set forth.

12. In a vehicle, the axle supporting the body and having wheels on its ends, said wheels having hollow hubs provided with raceways for the bearings, and said hubs containing hollow casings having complemental raceways for said bearings and vertical openings at their inner sides for the axle, combined with spring-cushioning means within said hubs for said axle, said means for each wheel comprising the said hollow casing forming within it a vertical chamber, an inverted-cup-shaped casing on the end of the axle disposed within said chamber, and a coiled spring confined within said chamber between said casings and receiving the load placed on the axle, said casings at their outer meeting faces being respectively provided with the vertical flange and groove; substantially as set forth.

13. In a vehicle, the axle supporting the body and having wheels on its ends, said wheels having hollow hubs, combined with spring-cushioning means within said hubs for the ends of said axle, said means for each wheel comprising a casing around which the wheel may turn and containing a vertical cylindrical chamber, an inverted-cup-shaped casing on the axle fitting within and adapted to guide on the walls of said chamber, a coiled spring confined at its ends between said casings and at its sides by the walls of said cup-shaped casing and adapted to receive the load placed on the axle, and means for keeping the first-mentioned casing vertical; substantially as set forth.

14. In a vehicle, the axle supporting the body and having wheels on its ends, said wheels having hollow hubs which are closed at their outer faces and open at their inner faces to receive the ends of the axle, combined with spring-cushioning means within said hubs for the ends of said axle, said means for each wheel comprising a non-rotatable casing around which the wheel may turn and affording a vertical chamber, a part on the axle extended into said chamber, and a coiled spring confined in said chamber between said part and said casing; substantially as set forth.

15. In a vehicle, the axle supporting the body and having wheels on its ends, said wheels having hollow hubs which are closed at their outer faces and open at their inner faces to receive the ends of the axle, combined with spring-cushioning means within said hubs for the ends of said axle, said means for each wheel comprising a non-rotatable casing around which the wheel may turn and affording a chamber, an inverted-cup-shaped casing on the end of the axle and disposed within said casing, and a coiled spring confined at its ends between said casings and at its sides by said cup-shaped casing; substantially as set forth.

16. In a vehicle, the axle supporting the body and having wheels on its ends, said wheels having hollow hubs which are closed at their outer faces and open at their inner faces to receive the ends of the axle, combined with spring-cushioning means within said hubs for the ends of said axle, said means for each wheel comprising a non-rotatable casing around which the wheel may turn and affording a chamber into which the axle projects, and a coiled spring confined within said chamber and receiving the load placed on the axle; substantially as set forth.

17. In a vehicle, the axle supporting the body and having wheels on its ends, said wheels having hollow hubs which are closed at their outer faces and open at their inner faces to receive the ends of the axle, combined with spring-cushioning means within said hubs for the ends of said axle, said means for each wheel comprising a non-rotatable casing around which the wheel may turn and affording a chamber into which the axle projects and which extends above and below the main horizontal plane of the axle, a part on the axle occupying the upper portion of said chamber, and the coiled spring confined within said chamber between said part and said casing and normally extending above and below the main horizontal plane of the axle; substantially as set forth.

18. In a vehicle, the axle supporting the body and having wheels on its ends, said wheels having hollow hubs closed at their outer faces and open at their inner faces to receive the ends of the axle, and the sprocket-wheel and the brake-flange open at their center to admit the axle through them and secured by bolts to the inner face of said hubs, combined with spring-cushioning means in said hollow hubs for the ends of the axle, said means for each hub comprising a non-rotatable casing around which the wheel may rotate, and a coiled spring receiving the end of the axle; substantially as set forth.

Signed at New York city, in the county of New York and State of New York, this 20th day of December, A. D. 1904.

EDWARD CLIFF.

Witnesses:
CHAS. C. GILL,
ARTHUR MARION.